May 19, 1964

B. J. PADLO 3,133,454

LOCKING DIFFERENTIAL

Filed Nov. 6, 1961

INVENTOR.
BERNARD J. PADLO
BY
WILSON, SETTLE & CRAIG
ATTORNEYS

May 19, 1964 B. J. PADLO 3,133,454
LOCKING DIFFERENTIAL
Filed Nov. 6, 1961 3 Sheets-Sheet 3

INVENTOR.
BERNARD J. PADLO
BY
WILSON, SETTLE & CRAIG
ATTORNEYS

United States Patent Office 3,133,454
Patented May 19, 1964

3,133,454
LOCKING DIFFERENTIAL
Bernard J. Padlo, 7410 Rutherford, Detroit 28, Mich.
Filed Nov. 6, 1961, Ser. No. 150,405
13 Claims. (Cl. 74—710.5)

This invention relates to differential gearing mechanisms, and more particularly to a differential gearing mechanism of the positive locking type, applicable to use in automotive vehicles such as automobiles, tractors, trucks and the like.

In automotive vehicles utilizing paired driving wheels, such as the rear wheels, almost universally used on American made automobiles, the rear axle is split into two sections; and centrally of these sections there is provided a differential gearing mechanism which makes it possible for one wheel to turn at a slightly different rate from the other as when the vehicle is rounding corners, traversing turns and the like. The differential makes it possible for each wheel to receive an equal amount of torque or power from the engine even though they are rotating at slightly different rates in traversing turns as long as each wheel is on solid driving ground or a high friction surface.

However, due to the nature of the differential, the beneficial feature may often become quite undesirable under certain circumstances. Thus, when one wheel is on solid driving ground, such as pavement for example, and the other wheel slips off into mud, gravel, snow, ice or the like, the wheel on solid ground stands still while the wheel on the low friction surface spins. Thus, the vehicle cannot remove itself from such a "stuck" condition.

Numerous attempts have heretofore been made to provide differentials to overcome this difficulty. Thus, efforts have been made to provide "limited" slip between the rear wheels, in effect, locking them together to cause them to drive as one up to the point of "break-away." However, these prior efforts have included units having a great number of parts that are expensive to manufacture and assemble and that are subject to deterioration under hard usage and constant slip. Thus, the "clutch" elements thereof wear and lose their original ability to transmit power. When it is necessary to service or overhaul such units, the costs run high because of the many parts involved. Further, the great majority of the prior art units have required special housings, gearings, etc., and this has necessitated discarding the old standard or stock differential unit of the vehicle when a limited slip unit was installed in place thereof.

Accordingly, if an improved locking differential could be provided that would be simple to manufacture, foolproof in operation, and adapted both for production automotive vehicles and for application to existing "in service" differential units alike, a substantial step forward in the art would be provided, making it possible for a motorist to traverse slippery surfaces; extricate himself from "stuck" conditions; and generally improve the performance of automotive vehicles.

With the foregoing in mind, it is an important object of the present invention to provide a novel differential of the positive locking type.

A further object is to provide a positive lockup type differential wherein the unit is engaged at the will of the operator of the vehicle.

Another object is to provide a positive lockup differential of simplified construction that may be coordinated with steering movements of the automobile to provide automatic operation.

Another object of the present invention is to provide a positive locking differential that is electrically actuated and that is of simplified and fool-proof construction.

A still further object is to provide an improved positive locking differential for automotive vehicles that is equally adapted to application to production vehicles as well as to "in-service" vehicles with standard production differentials incorporated therein.

Another object is to provide a novel positive locking differential wherein with very minor modifications, a standard differential is converted to the positive locking type so that application of the device to an "in-service" automotive vehicle makes use of the differential thereon so that the conversion can be made without scrapping the differential in favor of a new and totally different unit, thus substantially reducing costs of conversion as contrasted to the prior art.

Another object is to provide a positive locking differential that is substantially free of wear and therefore will outlast the vehicle into which it is installed.

Other objects of this invention will appear in the following description and appended claims, reference being had to the accompanying drawings forming a part of this specification wherein like reference characters designate corresponding parts in the several views.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

*The Environment*

Figure 1:
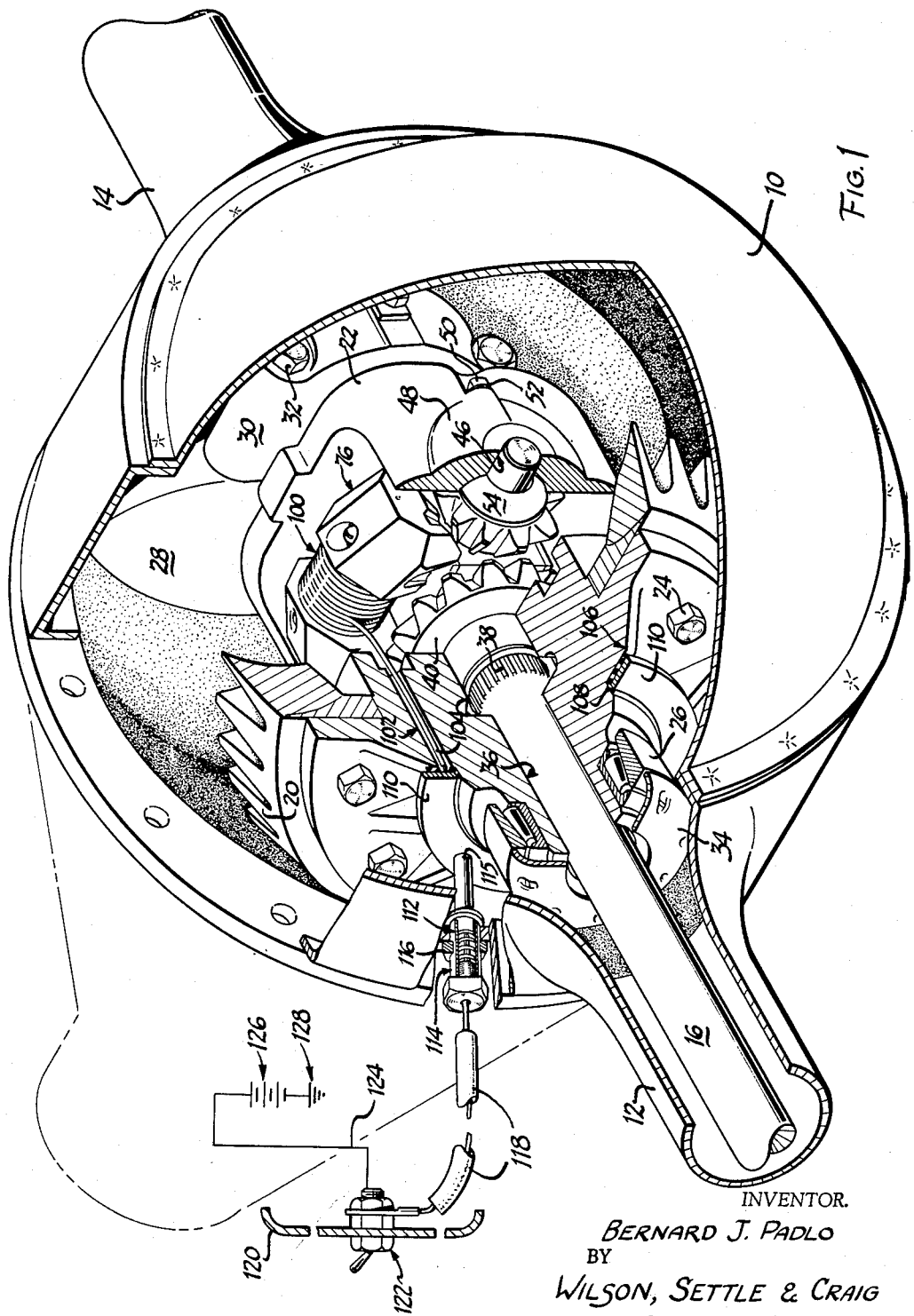
FIGURE 1 is a perspective view of an automobile differential assembly, typifying that in common use, with the locking mechanism of the present invention embodied therein.

As shown in FIGURE 1 of the drawings, the present invention has as its environment the driving or rear axle, typified by that widely used in American made automobiles and utilizing the normal differential principle found in substantially all automotive vehicles throughout the world. Such axle is of the rigid type, although it could be of the split type using universal joints for independent suspension of the rear wheels, and includes a steel carrier housing 10 within which the differential assembly is supported. Generally tubular rear axle shaft housings 12 and 14 extend from carrier housing 10 outwardly to the rear wheel positions, not shown, and rear axle shafts 16 and 18 are carried therein. On the terminal ends of the housings 12 and 14 and shafts 16 and 18 are mounted the normal rear wheel and brake assemblies.

A forwardly extending tubular projection, not shown, is provided on the front side of carrier housing 10 and supports a drive shaft roller bearing journaling the rear end of the engine drive shaft, upon which is mounted a hypoid drive pinion within the housing 10, to drive the hypoid drive gear 20 of the differential.

Inside of the differential carrier housing 10 there is provided a differential case 22 within which the differential gears are rotatably journaled and to which the hypoid drive ring gear 20 is attached by bolts 24.

The ends of the differential case 20 are journaled in roller bearings 26, carried by support blocks 28, cast into the housing 10, and having bearing retainer caps 30 secured thereto by bolts 32. Bearing retainers 34 are adjustably threaded into the support blocks 28 and the bearing retainer caps 30, behind each of the bearings 26 for retention and proper adjustment of bearing play or freedom. Thus, when the engine drive shaft is rotated, the hypoid drive pinion carried thereby drives the hypoid drive gear 20 fastened to the differential case 22 and thus the differential case 22 is also caused to rotate simultaneously with the hypoid drive gear.

Figure 2:
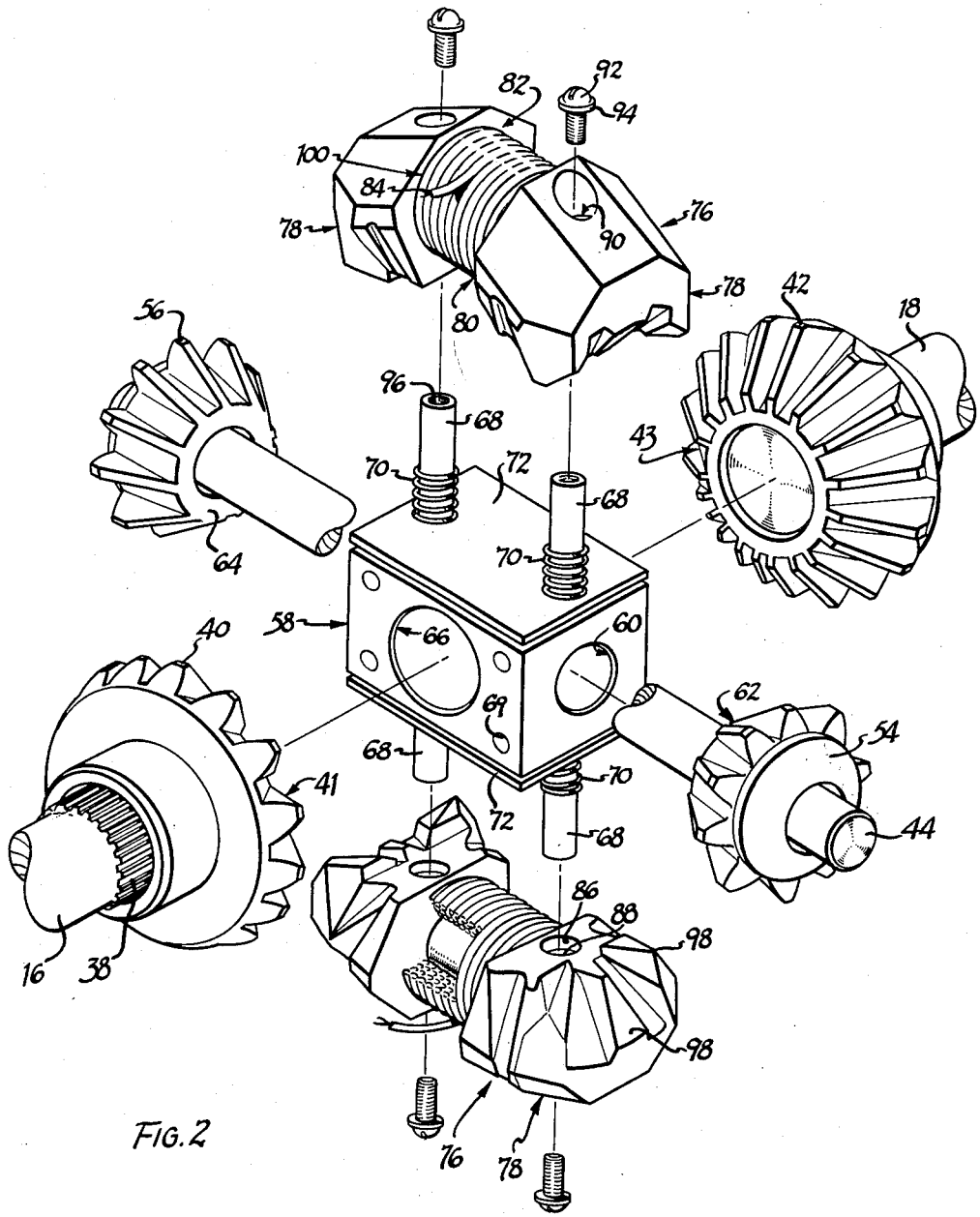
FIGURE 2 is an exploded perspective view of the differential locking mechanism of the present invention.

The differential case 22 is bored as at 36 in coaxial alignment with the roller bearings 26, supporting each end of the differential case, and the inner ends of the axle shafts 16 and 18 are inserted through the apertures 36 with the splines 38 thereof passing into the splined interior of differential side gears 40 and 42, best shown in FIGURE 2.

Transversely and centrally of the differential case 22 there is provided a differential pinion cross pin 44, FIGURE 2, the ends of which are mounted in apertures 46 of bosses 48 of the differential case. In the differential shown, the differential pinion cross pin 44 is locked in position by a lock bolt 50, FIGURE 1, positioned transversely to the cross pin 44 in an appropriate aperture of the boss 48, and locked by a washer 52. Riding on the differential pinion cross pin 44 are rotatably mounted the differential spider gears or spider pinions 54 and 56, that are of such diameter that the teeth thereof accurately mate with the teeth of the differential side gears 40 and 42 and rotate them when the differential case 22 is rotated by means of hypoid drive gear 20, the axle shafts 16 and 18 being rotated to drive the wheels carried thereby.

As shown in FIGURE 1, the spider pinion 54 is illustrated as not being in mesh with the differential side gear 40. This exaggeration has been purposely made in the present drawings to show more detail of the gears, which would be concealed if the gears were shown in mesh.

The interrelationship of intermeshing of the differential side gears 40 and 42 and the spider pinion 54 and 56 is assured by retained tolerances between appropriate thrust surfaces provided in the differential case 22 and the thrust surfaces formed on the backsides of all four of the gears of the cluster. Thus, a driving relationship is positively established.

As has been previously mentioned, rotation of the hypoid drive gear 20 causes rotation of the connected differential case 22, spinning the cross pin 44 and its spider pinions 54 and 56 about an axis extending through the axle shafts 16 and 18 to turn the wheels of the vehicle at the same rate when the vehicle is moving in a linear direction. However, for the purpose of negotiating turns, the spider pinions 54 and 56 can rotate relative to the differential side gears 40 and 42 and thus provide the well-known and normal differential action when conditions require the same. However, as has been previously mentioned, when one wheel of the vehicle slips off into the mire, it will spin preferentially to the other wheel on solid ground, and will not propel the vehicle forward. To overcome this situation and provide a locked pair of rear driving wheels, the present invention is superimposed upon the previous environmental background, and a detailed explanation and description of the invention with relation to such environment will now follow.

*The Invention—The Support Block*

As shown in FIGURE 2, an elongated support block 58 of generally square section is provided coaxially with a cylindrical bore 60, adapted to receive the differential pinion cross pin 44. Thus, the support block 58 is positioned between the inner surfaces 62 and 64 of the spider pinion 54 and 56.

In a normal production run differential, the inner surfaces 62 and 64 of the spider pinions 54 and 56 are normally machined with a very course cutting tool and are therefore ridged and very rough because such surfaces normally do not bear against anything and do not need to be finish machined. Also, there are no close tolerances maintained on the inner ends of these gears. Therefore, to accommodate the support block 58, the surfaces 62 and 64 are dressed off to established tolerances to provide a rotatable relationship between the surfaces 62 and 64 of the spider pinion 54 and 56 and the ends of support block 58 during differential action, as when the present invention is not actuated to positively lock-up the differential and in effect provide a rigid rear axle.

Also, the inner surfaces or inner faces 41, 43 of the differential side gears 40, 42 are also faced off to established tolerances to accommodate the support block 58 with appropriate clearance.

Also, as shown in FIGURE 2, the support block 58 is provided with a transverse cylindrical bore 66 that is of a diameter large enough to receive the ends of the axle shafts 16 and 18 in free-running relation. This provision is made because in one popular make of automobile there is a substantial tolerance in the lengths of the axle shafts 16, 18 and thus the distance retained between the ends of the axle shafts 16 and 18. Accordingly in the present invention the axle shaft ends are accommodated within the bore 66 so that no modification to the ends of the shaft is required in adapting a standard differential to receive the present invention. At this point it might be mentioned that another popular make of automobile provides its axle adjustment at the wheel end, and thus relies upon a spreader between the inner ends of the axle shafts to provide an appropriate tolerance for the spacing thereof. To accommodate this type of construction, a sleeve or counterbore is provided in the bore 66 to provide an abutting surface for the shaft ends and give the appropriate spacing. Thus, by very slight modification, the block 58 is adapted to use in substantially all automotive differentials.

*The Guide Pins and Compression Springs*

As shown in FIGURE 2, the top and bottom surfaces of the support block 58 are each provided with a pair of aligned guide pins 68 and these are suitably applied by forming bores in the block 58 to receive the lower ends of the guide pins 68, locking being effected by tapered dowel pins 69. The guide pins as shown, are positioned transversely of the axis of the support block 58 and in alignment therewith. Each of the guide pins 68 is fitted with a compression spring 70 for a purpose to be hereinafter stated.

*The Gear Locking Armature or Electromagnet*

It is upon the aforedescribed support block 58, with the guide pins 68 carried thereby and the compression springs 70 that the gear-locking armature or electromagnet of the invention is positioned, to operate and lock the differential, absolutely preventing a normal differential action.

Thus, as shown in FIGURE 2, the gear locking armature is designated by the reference numeral 76, the two shown in the embodiment in FIGURE 2, being identical. Each gear locking armature 76 is a generally elongated block of high tensile steel having a gear tooth locking element 78 at each end. Each armature 76 is reduced in diameter centrally as at 80, suitably as a rod or cylindrical body portion for ease of machining, that is defined at its ends by spaced shoulders 82 to receive a plurality of turns of magnet wire 84, the inner most end of the wire being connected to the gear-locking armature 76 itself to provide a ground and thus complete an electric circuit, as will be hereinafter described.

From FIGURE 2 it will be observed that a pair of aligned cylindrical bores 86 are provided through each of the gear locking armatures 76 to accommodate the guide pins 68 in slidable relationship and thus permit the gear locking armatures to be moved toward and away from the support block 58. Each of the cylindrical bores 86 is counteredbored to provide a shoulder as at 88 so that the outer ends of the compression springs 70 can bear thereagainst and bias the gear locking armature 76 outwardly away from the support block 58 and thus out of engagement with the teeth of the differential side gears 40, 42 and the spider pinions 54, 56. The cylindrical bores 86 are also counterbored at the top ends, as shown at 90, so that when the gear locking armature 76 is positioned upon pins 68, machine bolts 92 with attached lock washers 94 can be applied to threaded bores 96 in the outer ends of each of the pins 68, to retain the gear locking armatures 76 in an outer limit of travel when it is free of engagement with the gears when the unit is not operating.

As best shown on the armature 76 at the bottom of FIGURE 2, each of the gear tooth locking elements 78 is provided with a plurality of gear tooth engaging projections 98, which, when the armature 76 is pressed into contact with the block 58, are caused to engage two teeth of a spider pinion 54, 56 and one tooth of each of the differential side gears 40, 42. Thus, each of the gear tooth locking elements 78 engages four gear teeth, making a total lock of each end of eight gear teeth, and a total lock of two gear locking armatures of 16 teeth. It will be evident in view of this large distribution of locking surface that no parts are unduly stressed and an extremely large locking area is provided for absolute lock-up.

The Magnetic Flux Insulator

Also, as shown in FIGURE 2, the top and bottom surfaces of the support block 58 are provided with flux insulating plates 72 and 74, suitably made of brass or other non-magnetizable material to provide a positive break in the flux path between the armature or electromagnet 76 and the support block 58, so that these parts are positively released when the electromagnetic flux field is broken, by stopping the flow of electricity through the armature.

The Configuration of the Gear Tooth Engaging Projections 98

It is a meritorious feature of the present invention that the gear tooth engaging projections 98 are so configured that when engagement is made between the teeth of the differential side gears 40, 42 and of the spider pinions 54, 56, that contact between the working surfaces of the gear tooth engaging projections and the working surfaces of the teeth is made on a tangent to the surfaces. The result is that there is absolutely no tendency for the gear locking armature 76 to be thrown or forced out of engagement with the gear teeth against the bias provided by the magnetic flux field of the solenoid coil 100 on armature 76.

The Electrical Circuit

By referring now to FIGURE 1, which shows the unit of the present invention installed in a typical automobile differential, it will be observed that a small bore 102 is drilled through the differential case 22 to receive an insulated lead wire 104 from the solenoid coil 100. At this point a further slight modification is required for adapting a standard differential to receive the present invention. Thus, as shown in FIGURE 1, an annular shoulder 106 is machined in the differential case 22, after which an annulus 108 of electrical insulating material of L-shaped cross section is applied, followed by suitably press fitting a collector ring 110, also of annular configuration.

An aperture is provided in the insulating annulus 108 and the stripped end of the lead wire 104 is passed therethrough for engagement with the backside of the annular collector ring 110 in electrical contacting relationship.

A further slight modification is also required by drilling the housing 10 as at 112 to receive an electrically conducting brush assembly 114 in threaded relationship, being secured against movement by a lock nut 116. The electrical circuit is completed by a single wire 118, extending to the instrument panel 120 of the automobile, where connection is made to a toggle switch 122, secured in a suitable hole in the instrument panel. A connecting wire 124 extends to the battery 126 of the automobile, one side of which is grounded as at 128.

Operation of the Invention

From the foregoing, it will be obvious that the present invention is installed into a standard production automotive differential with very minor modification thereto. For operation, the driver of the vehicle merely flips the toggle switch 122 and this causes electric current from the battery 126 to flow by lines 124, 118, brush assembly 114, collector ring 110, lead wire 104 into the solenoid coil 100, one end of which is ground, to complete a circuit. This section instantaneously draws the gear locking armature 76 inwardly toward the supporting block 58 against the bias of compression spring 70, causing the gear tooth engaging projection 98 to ride the top surfaces of the gear teeth of the differential side gears 40, 42 and the spider pinions 54, 56 until slight differential action provides an appropriate alignment whereby the gear locking armature drops into place providing a positive lock of the differential and nullifying normal differential action.

With both driving wheels thus locked up, the wheel on firm ground will propel the vehicle from a "stuck condition."

It will be observed that when electric current flows in the solenoid coil 100, viewing FIGURE 2, a typical, circular field or flux path will be generated extending downwardly into the support block 58 to draw the gear locking armature into locking engagement with the teeth of side gears 40, 42 and spider pinions 54, 56. In this respect, it should be pointed out that the guide pins 68 are non-magnetic, being made of a material such as stainless steel, so as not to interrupt the flux path and divert it from its proper entry into the magnetizable block 58.

After the driver of the vehicle has extricated himself from a difficult situation, such as having one wheel off the pavement or on a slippery surface, he will probably prefer to disengage the unit to provide normal differential action to avoid the slight tire wear that ensues from a locked differential when traversing turns. Accordingly, he merely flips the toggle switch 122 to stop the current flow, and this action breaks the flux path, and with the aid of the flux breaker insulating plate 72, the springs 70 readily bias the gear locking armature 76 outwardly to abut against the lock washers 94 of the machine bolts 92 to give an operating clearance between the gear tooth-engaging projections 98 and the teeth of the differential side gears 40, 42 and the spider pinions 54, 56.

In answer to any questions that may arise as regards the exposure of the solenoid coil 100 and the brush 115 of the brush assembly 114 to the differential lubricant contained within the housing 10, it should be stated that there is no harm or deterioration to the components of the invention by such exposure. All that need be done is apply an oil resistant covering such as synthetic rubber or magnet varnish to the turns 84 of magnet wire. The rest of the elements are of metal, just like the gears and other parts of the differential and with respect to these elements there is no problem. Inasmuch as the brush 115 is made of graphite, it is resistant to deterioration by the differential lubricant and similarly no problem is raised with regard thereto.

Alternate Electric Circuit for the Invention

The locking differential of the present invention is beautifully applicable to operation under sustained periods of lock-up inasmuch as a very small amount of current is required to actuate the unit and therefore no appreciable drain on the electrical system of the automobile is provided. In many instances, during winter weather, where highways are covered with patches of ice and snow it may be desired even on long trips to keep the unit engaged and thus provide a positive drive at all times and better vehicle control.

Figure 3:
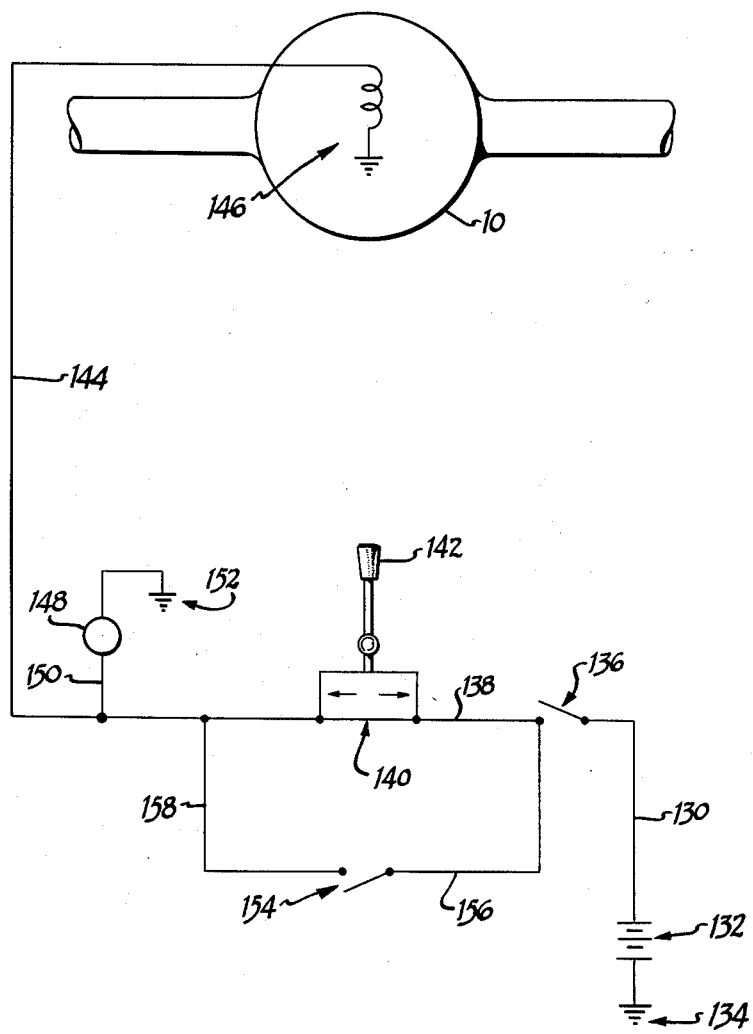
FIGURE 3 is a schematic diagram of one form of electrical circuit adapted for use in the present invention.

This can be provided in accordance with the electrical circuit of FIGURE 3, wherein a wire 130 leads from battery 132, grounded at 134, to the ignition switch 136 whereby current is flowed into the circuit when the engine is started. From the ignition switch 136, a lead wire 138 connects to a turn signal actuated two way switch 140, operably connected to the turn signal handle 142. The switch 140 is of a nature that when the handle is in neutral position, a circuit is completed by a lead wire 144 through the locking mechanism designated by arrow 146 carried within the differential housing 10 of the automobile. However, when the turn signal handle is moved in either direction as for making a turn, the switch 140 breaks the circuit until the turn is completed and the handle 142 returns to its neutral position to re-establish the circuit. Thus, under adverse conditions of driving, the unit may be engaged at all times for highest propulsion efficiency through the driving wheels, but is disengaged when rounding signalled turns, to avoid tire wear from lack of differential action.

A signal lamp 148, including a lead 150 to line 144 and a ground 152, is provided on the instrument panel for visibility to the driver to indicate when the system of the present invention is in operation.

In extremely bad weather as under icing conditions, when it is desired to keep the unit of the invention engaged at all times, even in tight turns for improved vehicle control, an override switch 154 is provided in by-passing relation to the turn signal actuated switch 140, being connected by lines 156 and 158. The benefits of such operation are readily evident to the seasoned driver.

Extended Scope of Invention

In the foregoing description, it has been stated that the support block 58 is made of magnetizable material. Thus iron, steel and other magnetizable alloys and materials can be used for the fabrication of this element of the present invention.

The guide pins 68 have been recited as being fabricated of non-magnetic material and stainless steel is one suitable material that can be used in making these components. However, it is also to be included within the scope of the invention to make the pins of high strength brass or other non-magnetic alloys and materials. Further, as regards the guide pins 68, it is to be included within the scope of the invention to fabricate these elements of shapes other than cylindrical pins. Thus guide elements of hexagonal, square, rectangular and other cross section can be employed.

Also in further regard to the guide elements 68, the foregoing description has related to these elements being formed on or secured to the support block 58. However, within the broad scope of the invention, these guide elements can be connected to the armature or electromagnetic gear lock for slidable relation into the support block by means of suitable bores or apertures formed therein, provision being made as by stop shoulders to establish the limits of movement of the armature.

Still further the guide pins can be threaded into the support block as well as the dowel construction shown.

Also, as regards the mounting of the armature, it is to be included within the scope of the disclosure to hinge the armature at one end to the support block. When so operating, the free end of the armature may be guided for limited movement and gear-locking projections provided on that free end for engagement with a spider pinion and/or an end gear for locking the same against rotation.

Also, the foregoing description has related to the gear tooth-engaging projections 98 for teeth of the spider pinion and both of the side gears. In some applications such as lighter duty differentials, a positive lock may be provided by engagement between the armature and teeth of a pinion gear or a side gear or by both side gears or other combination.

In place of the spring 70 on the pins 68, other biasing arrangements may be utilized and within the broad scope of the invention, it may be desirable in some instances to provide a rubber sleeve over the pins 68 of a suitable spring rate to provide an action equivalent to the spring 70.

As regards the fabrication of the flux breaker insulating plates 72, these may be made of substantially any oil-resistant insulating material, including brass shim stock, phenolic resins, and the like of an insulating character.

As regards the magnetic flux insulating shim or plates 72, these need not necessarily be made as from flattened brass stock; instead, they can be made in the form of screens or analogous grid members, such as perforated sheet stock, to permit oil to pass readily through them and avoid any suction condition developing that would retard the release of the armatures 76. In units actually used and tested in accordance with the present invention, no problems have been encountered in this regard. However, if desired, oil break-away grooves could be provided in the bottom surfaces of the gear-locking armature 76, which contact the upper surface of the flux breaker insulating plates 72 to provide utmost freedom of release. As noted in FIGURE 2, the bottom armature thereof, it will be understood that very small contact area is presented between the bottom of the armature 76 and the outer surface of the plate 72 and thus little if any tendency toward suction action even in the presence of a heavy lubricant is provided to retard release of the locking armature.

Also, it is to be included within the broad scope of the invention to utilize only one gear-locking armature 76 to provide a positive locking action, as contrasted to the double unit shown for still greater economy of manufacture.

Also, as in lighter duty applications, the number of gear tooth-engaging projections 98 can be reduced so that only one tooth of a spider pinion 54 or 56 is engaged for locking. This would tend to still further reduce costs of machining of the gear-locking armature 76 for further economies of manufacture.

Another aspect of the invention resides in the formation of the support block 58 on the cross pin 44. Normally the spider pinions are loaded into the differential case 22 through an open side and after proper alignment, the pin is inserted through the bores of the case. However, in the broad scope of the invention, the support block and pin 44 could be forged or machined as an integral unit and gear assembly made by:

(1) Apply 1st spider pinion and align;
(2) Insert pin-support block;
(3) Apply 2nd spider pinion;
(4) Apply bolt on boss 48 to support other end of pin 44.

Although the foregoing description has shown as the environmental background a differential and housing set-up utilized by one of the larger American manufacturers, it is to be included within the scope of the invention to apply the present locking mechanism to any standard automobile differential using two spider pinions so that the gear locking armatures 76 can be accommodated therebetween. This would broadly include application to rear wheel or front wheel drive vehicles, as well as 4-wheel drive units.

Advantages of the Present Invention

From the foregoing it will be understood that a positive locking differential is provided in accordance with the present invention as contrasted to the limited slip units of analogous nature of the prior art. Also, the differential of the present invention is subject to absolute control by the vehicle operator, to be engaged and disengaged at his will and when needed, as contrasted to the so-called automatic application units of the prior art.

As contrasted to the prior art units of so-called limited slip and automatic application, where constant wear is present at all times due to the engagement of the clutch elements contained therein, the present invention is characterized by a complete absence of wear because there are no moving parts involved, except when the gear tooth locking armature is moved in and out on its guide pins 68. Otherwise, there is either a complete lock of the gears or a complete disengagement of the armature from the gears and an absolute absence of wear either when the unit is engaged or disengaged. Further, the unit is characterized by extremely long life as constrasted to the wear of the prior art limited slip units; in the present invention it is apparent that the unit will outwear the automobile or vehicle in which it is installed because of the absence of wearing parts therein.

Further, it is a particular advantage of the present invention that it is equally applicable to new production line units, or by very slight modification, to used units. Thus no scrapping of the used units is entailed as is the case when the limited slip units of the prior art are applied, which utilize a different arrangement of differential case and thus are not adapted to application to the standard differential case and parts. To illustrate simplicity of application to a standard unit, the following steps and modification of obvious simplicity are utilized:

(1) Disassemble unit and clean-up differential side gears 40, 42 and the spider pinions 54, 56.

(2) Apply support block 58 to differential pinion cross pin 44, with armatures 76 previously mounted, and thread lead wire 104 through bore 102 after forming the same.

(3) Machine the annular shoulder 106 on differential case 22 and press on the insulation 108 and collector ring 110, providing engagement for the bare end of lead wire 104.

(4) Apply insulated brush and connect wire therefrom to instrument panel.

(5) Make necessary reassembly of the differential to the automobile and connect to power.

It will be evident to those skilled in the art from the foregoing that pre-dressed differential side gears 40, 42 and spider pinions 54, 56 as well as preringed gear cases can be retained in stock by a dealer and a gear exchange can be made with the previously dressed parts to speed application to the automobile, the customer being given credit for his exchanged parts. Thus, it will be evident as contrasted to the prior art, that the customer is not forced to assume the costs of discarded parts, and that only a minor modification labor cost to the parts of the differential are required. It is readily evident to those skilled in the art from the foregoing, that a very substantial economy is provided as contrasted to the prior art applications of the so-called positive traction units now available.

From the foregoing, it will also be evident that it is very easy for a manufacturer to apply the present locking differential in new production automobiles. All that is necessary is that minor modifications of the parts as itemized above be made to regular production units and therefore the absolutely positive locking unit of the present invention is provided, in the same manner in which a stock differential is modified in a used car. Of course on production run items, disassembly and reassembly labor is obviated, provided still further economies.

It is a further advantage of the present invention that when a gear locking armature 76 is used on each side of the spider gears, they are individual and thus failure of one has no effect on the other. Accordingly, it should be pointed out that the units are not wired in series, but instead are wire in parallel for independent operation.

Further, it is an important advantage of the present invention that it is applicable to all types of differentials utilizing two spider pinions, typified by 54, 56 of the drawings accompanying this specification. Thus, Ford, General Motors and Chrysler cars and others can have the stock differentials thereof fitted with the present invention. Loading techniques of the different differential cases utilized in these automobiles may be slightly different but, the principle of operation of the unit in the environment provided by those differentials is the same by locking the differential side gears and the spider pinions positively to each other by means of an electromagnetically actuated gear-locking armature.

Thus, in its broadest application, the magnetically actuatable locking differential of the present invention is applicable to automobiles, pick-up trucks, heavy duty trucks, farm and industrial tractors, heavy road construction machinery and other vehicles utilizing a differential, and a most important aspect of the invention is the long life of the unit without wear.

A still further advantage of the invention resides in the substantially complete absence of maintenance. About the only service required to the present invention is that analogous to the maintenance of the generator of an automobile, in that it has a carbon brush held in place by a removable plug in the differential housing. This may need occasional replacement; however other than this aspect, it has the durability and trouble free characteristics of any other time tested electrical equipment in the vehicle.

Having thus described my invention, I claim:

1. In a differential gearing assembly including a differential case with axle shaft ends extending into the case and having differential side gears mounted thereon within the case, and having spider pinion gears mating with the side gears and mounted on a differential pinion cross pin carried by the differential case, the improvement of a magnetizable block mounted on the differential pinion cross pin between the pinion gears and the side gears, non-magnetic guide means formed on said block, a gear-locking armature movably carried on said guide means and movable toward and away from said block and having projections thereon adapted to engage the teeth of at least one of the side gears and at least one of the pinion gears to lock said gears against rotation relative to each other, means normally biasing said armature away from locking engagement with said gears, and means for electrically energizing said armature to pull the same against said block and thereby lock the gears against relative rotation.

2. In a differential gearing assembly including a differential case with axle shaft ends extending into the case and having differential side gears mounted thereon, with spider pinions mating with the side gears and mounted on a differential pinion cross pin carried by the differential case, the improvement of a magnetizable block mounted on the differential pinion cross pin, guide means on said block, a locking dog carried on said guide means and movable toward and away from said magnetizable block and having projections thereon engageable with the teeth of at least one of the side gears and at least one of the spider pinions to lock the same against relative rotation with one another, means biasing said locking dog away from locking engagement with the gears, and means for electromagnetically attracting said block to pull said dog toward said block and thereby lock the gears against relative rotation.

3. In a differential gearing assembly including a differential case with axle shaft ends extending thereinto and having differential side gears mounted thereon and rotatable with respect to the case, with spider pinions mating with the differential side gears and mounted on a differential pinion cross pin supportably carried by the differential case, the improvement of a magnetizable support block mounted on the differential pinion cross pin, guide means on said block positioned between the differential side gears, an electromagnetic locking dog carried on said guide means and movable toward and away from said block and having means thereon engageable with the teeth of at least one of a side gear and spider pinion to lock the same against rotation, means biasing said locking dog away from said mounting block, and means for connecting said locking dog to a source of electric current.

4. In a differential gearing assembly including a differential case having a differential side gear and a spider pinion both rotatably mounted therein and positioned in driving relationship with one another, the improvement of a magnetizable body positioned adjacent the differential side gear and spider pinion, a gear locking armature, guide means carried by one of said magnetizable body and said armature, said armature being directed by said guide means for movement toward and away from said magnetizable body, gear locking projections on said armature engageable with the teeth of at least one of the differential side gear and spider pinion to lock the same against relative rotation, means biasing said armature away from contacting relation with said one of the side gear and spider pinion, and means for alternately magnetizing and demagnetizing said magnetizable body and said armature in attracting relation with respect to one another.

5. In a differential gearing assembly including a differential case having a differential side gear rotatably journaled therein, a differential pinion cross pin carried by the differential case, a spider pinion rotatably mounted upon the cross pin and positioned in driving relation to the side gear, the improvement of a support block having a longitudinally extending bore adapted to fit upon the cross pin, guide means carried by said support block, a gear locking dog mounted on said guide means for movement toward and away from said support block, locking means on said dog engageable with the differential side gear and spider pinion to lock the same against rotation, means biasing said dog away from said support block, and means for moving said dog toward said support block.

6. In a differential gearing assembly including a differential case having opposed differential side gears rotatably mounted therein, a differential pinion cross pin carried by the differential case, opposed spider pinions rotatably journaled upon the cross pin, the pinions being in driving relation with the side gears, the improvement of a support block having a longitudinally extending bore adapted to fit upon the cross pin between the spider pinions and side gears, oppositely directed guide means carried by said support block and positioned between the differential side gears, a gear locking dog mounted on each of said oppositely directed guide means for movement toward and away from said support block, locking means on at least one of said gear locking dogs engageable with at least one differential side gear or spider pinion to lock the same against rotation, means biasing said dogs away from each other, and means for electromagnetically moving said dogs toward one another.

7. In a differential gearing assembly including a differential case having a differential side gear rotatably journaled therein, a differential pinion cross pin carried by the differential case, a spider pinion rotatably mounted upon the cross pin and positioned in driving relation to the side gear, the improvement of a magnetizable support block mounted on the cross pin, non-magnetizable guide means carried by said support block, a gear locking armature mounted on said guide means for movement toward and away from said support block, gear locking means on said armature engageable with at least one of the differential side gear and spider pinion to prevent rotation thereof relative to the case, a magnetic flux-breaking plate positioned between said lock and said armature, an electromagnetic coil positioned on said armature and adapted to produce a flux pattern extending into said magnetic support block, and means for connecting said coil to a source of electrical current.

8. In a differential gearing assembly including a differential carrier housing, a differential case rotatably journaled within the housing, a pair of opposed differential side gears rotatably journaled within the differential case, a spider pinion cross pin carried by the differential case, a pair of spaced spider pinions rotatably mounted upon the cross pin in driving relation to the side gears, the improvement of a magnetizable support block mounted on the cross pin, a pair of non-magnetic guide pins carried by said support block and positioned between the differential side gears, an electromagnet mounted on said guide pins for movement toward and away from said support block, flux breaking means positioned between said block and said electromagnet, gear locking means carried by said electromagnet and engageable with at least one of the differential side gear and spider pinion to prevent rotation thereof relative to the case, a collector ring mounted on the differential case in electrically isolated relationship thereto, means electrically connecting said electromagnet and said collector ring, an electrically conducting brush extending in electrically isolated relation through the differential carrier housing into contacting relationship with said collector ring, and means for connecting said brush to a source of electrical current.

9. In a differential gearing assembly including a rotatable differential side gear and a rotatable spider pinion positioned in driving relation, the improvement of a magnetizable body positioned adjacent the gears, a magnetizable dog, means for guiding said dog relative to said magnetizable body, gear locking means on said magnetizable dog engageable with the gears for locking the same against relative rotation, means biasing said dog away from said magnetizable body, and means for electromagnetically attracting said magnetizable dog and said magnetizable body toward one another.

10. In a differential gearing assembly including a differential case having opposed differential side gears rotatably mounted therein, a differential pinion cross pin carried by the differential case, opposed spider pinions rotatably journaled upon the cross pin, and the side gears being in driving relationship with the spider pinions, the improvement of a magnetizable body on said cross pin, an electromagnetic gear lock, means guiding said dog relative to said magnetizable body, flux breaking means between said magnetizable body and said gear lock, means biasing said gear lock away from said magnetizable body, and means for connecting said gear lock to a source of electrical current.

11. In a positive locking differential, a differential carrier housing, a differential case rotatably journaled within said housing, a pair of opposed differential side gears rotatably journaled within said differential case, a spider pinion cross pin carried by said differential case, a pair of opposed spider pinions rotatably journaled on said cross pin in driving relation to said side gears, a magnetizable body connected to said cross pin between said spider pinions, an electromagnetic gear lock, guide means formed on said gear lock, aperture means in said magnetizable body adapted to slidably receive said gear lock guide means, flux breaking means between said magnetizable body and said gear lock, means biasing said gear lock away from said magnetizable body, a collector ring mounted on said differential case in electrically isolated relationship thereto, means electrically connecting said electromagnetic gear lock and said collector ring, an electrically conducting brush extending in electrically isolated relation through said differential carrier housing into contacting relationship with said collector ring, and means for connecting said brush to a source of electrical current.

12. In an electromagnetically actuated locking differential system for an automotive vehicle having a differential and a turn signal control handle, the differential including a differential side gear rotatably mounted therein, a differential pinion cross pin, a spider pinion rotatably mounted upon the cross pin and positioned in driving relation to the side gear, the improvement of a support block connected to the cross pin, an electromagnetic gear lock, guide means on one of said block and said lock, aperture means in one of said block and said lock adapted to slidably receive said guide means whereby said lock is adapted to move toward and away from said support block, a switch operably connected to the turn signal indicator, adapted to break contact on movement of the turn signal control handle from neutral position, and means electrically connecting said switch and said lock in circuit to a source of electric current.

13. The system defined in claim 12, including a line by-passing said switch and an override switch in said line.

References Cited in the file of this patent

UNITED STATES PATENTS 1,280,535    Perko _____ Oct. 1, 1918